United States Patent
Branco

(10) Patent No.: US 10,360,373 B2
(45) Date of Patent: Jul. 23, 2019

(54) RETURN ADDRESS ENCRYPTION

(71) Applicant: Intel Corporation, Santa Clara, CA (US)

(72) Inventor: Rodrigo R. Branco, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 15/278,780

(22) Filed: Sep. 28, 2016

(65) Prior Publication Data
US 2018/0089427 A1    Mar. 29, 2018

(51) Int. Cl.
| | |
|---|---|
| G06F 21/52 | (2013.01) |
| H04L 9/14 | (2006.01) |
| H04L 9/00 | (2006.01) |
| H04L 9/06 | (2006.01) |

(52) U.S. Cl.
CPC .............. *G06F 21/52* (2013.01); *H04L 9/002* (2013.01); *H04L 9/0662* (2013.01); *H04L 9/14* (2013.01)

(58) Field of Classification Search
CPC .. G06F 21/56; G06F 21/602; G06F 2221/034; G06F 21/125; G06F 21/44; G06F 21/445; G06F 21/45; G06F 21/46; G06F 21/50; G06F 21/51; G06F 21/52; G06F 21/53; G06F 21/54; G06F 21/64; G06F 21/645; H04L 9/14; H04L 9/002; H04L 9/0662
USPC ........................................................ 713/187
See application file for complete search history.

(56) References Cited

U.S. PATENT DOCUMENTS

| | | | |
|---|---|---|---|
| 7,581,089 B1* | 8/2009 | White | G06F 12/1416 712/242 |
| 9,037,872 B2 | 5/2015 | Kaplan | |
| 9,195,851 B1* | 11/2015 | Chandra | H04L 9/0894 |
| 9,606,855 B1* | 3/2017 | Duvalsaint | G06F 9/3806 |
| 2003/0065929 A1* | 4/2003 | Milliken | G06F 21/52 713/189 |

(Continued)

OTHER PUBLICATIONS

"International Application Serial No. PCT/US2017/048355, International Search Report dated Dec. 5, 2017", 3 pgs.

(Continued)

*Primary Examiner* — Shahriar Zarrineh
(74) *Attorney, Agent, or Firm* — Schwegman Lundberg & Woessner, P.A.

(57) ABSTRACT

Disclosed in some examples are methods, systems, and machine readable media for encrypting return addresses with a cryptographic key. The call and return operations may be changed to incorporate an XOR operation on the return address with the cryptographic key. Upon calling a function, the return address may be XORed with the key which encrypts the return address. The encrypted return address may then be placed upon the stack. Upon returning from the function, the return address may be retrieved from the stack and XORed with the cryptographic key which then decrypts the return address. The processor may then return control to the address indicated by the unencrypted return address. This method makes modifications of the return address useless as an attack vector because the result of modifying the return address will be unpredictable to the attacker as a result of the XOR operation done on the return address.

11 Claims, 6 Drawing Sheets

(56) References Cited

U.S. PATENT DOCUMENTS

| | | | | |
|---|---|---|---|---|
| 2003/0217277 | A1* | 11/2003 | Narayanan | G06F 11/2284 713/187 |
| 2004/0266523 | A1* | 12/2004 | Gentles | G07F 17/323 463/29 |
| 2006/0101128 | A1* | 5/2006 | Waterson | G06F 21/52 709/212 |
| 2006/0126827 | A1 | 6/2006 | Milleville | |
| 2007/0192592 | A1* | 8/2007 | Goettfert | G06F 12/1408 713/162 |
| 2008/0133858 | A1* | 6/2008 | Enbody | G06F 21/52 711/163 |
| 2008/0301469 | A1 | 12/2008 | Plouffe, Jr. et al. | |
| 2009/0038008 | A1* | 2/2009 | Pike | G06F 21/52 726/22 |
| 2014/0096245 | A1* | 4/2014 | Fischer | G06F 21/52 726/23 |
| 2014/0331028 | A1* | 11/2014 | Demongeot | G06F 9/3861 712/205 |
| 2015/0302195 | A1* | 10/2015 | Acar | G06F 21/54 726/23 |
| 2016/0094552 | A1 | 3/2016 | Durham et al. | |
| 2016/0099919 | A1* | 4/2016 | Daniels | H04L 63/0428 713/155 |
| 2016/0171211 | A1* | 6/2016 | Chen | G06F 12/1408 726/23 |
| 2016/0171214 | A1* | 6/2016 | Chamley | G06F 21/54 726/23 |
| 2016/0239678 | A1 | 8/2016 | Gilbert | |
| 2016/0239835 | A1* | 8/2016 | Marsyla | G06Q 20/3829 |
| 2017/0017791 | A1* | 1/2017 | Brandt | G06F 21/52 |
| 2017/0046280 | A1* | 2/2017 | Driessen | G06F 12/1408 |
| 2017/0083882 | A1* | 3/2017 | Kim | G06Q 20/102 |
| 2018/0060585 | A1* | 3/2018 | Griswold | G06F 21/567 |

OTHER PUBLICATIONS

"International Application Serial No. PCT/US2017/048355, Written Opinion dated Dec. 5, 2017", 12 pgs.

Intel, "Control-flow Enforcement Technology Preview", https://software.intel.com/sites/default/files/managed/4d/2a/control-flow-enforcement-technology-preview.pdf, (Jun. 2016), 136 pgs.

Widawsky, Ben, "OS backtrace with symbol names Goodbye Sabbatical", Blog: bwidawsk dumbing things up, [Online]. Retrieved from the Internet: <URL: https://bwidawsk.net/blog/index.php/2014/10/symbol-with-names-for-an-os-backtrace/>, (Oct. 21, 2014), 13 pgs.

* cited by examiner

RETURN ADDRESS ENCRYPTION

TECHNICAL FIELD

Embodiments pertain to processor microarchitecture. Some embodiments relate to improved security of computer architecture.

BACKGROUND

Current computer processors operate according to a predetermined set of instructions called the instructions set architecture (ISA). The ISA is the programming model that determines such things as address formats, names of processor registers, and other relevant programming information. Software written in higher level languages (such as C) get compiled into instructions that correspond to the ISA of the particular processor the software is to be run on. While different processors may run the same ISA, the actual microarchitecture of the processor may be different. A processor's microarchitecture determines how the ISA is implemented. The microarchitecture is the physical arrangement and interaction of gates, registers, Arithmetic Logic Units (ALUs), and other units within the processor. The computer architecture comprises the combination of microarchitecture and the ISA.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
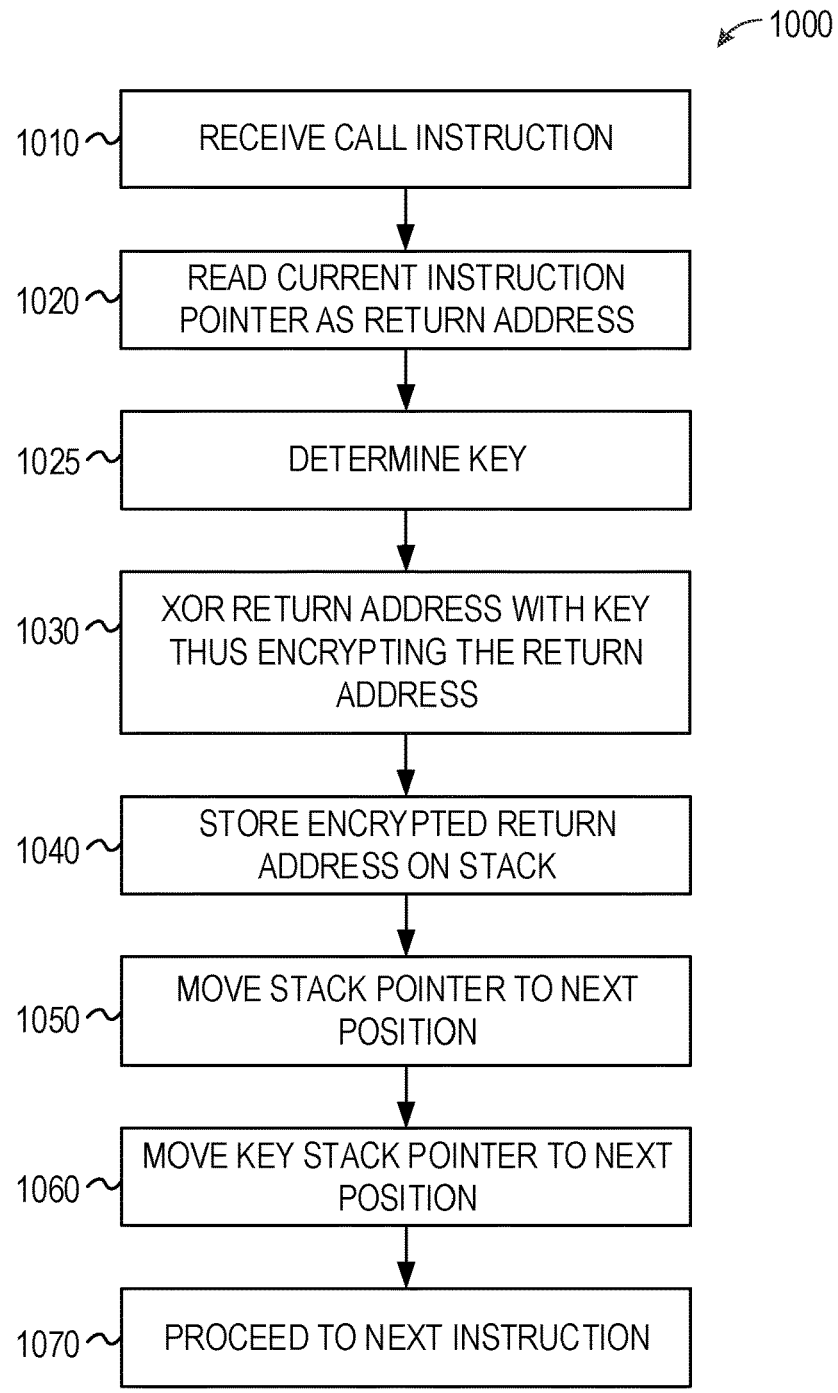
FIG. 1 shows a flow chart of a method for a call function utilizing one-time pad (OTP) encryption on the return address according to some examples of the present disclosure.

Many modern processors use an ISA that features a data structure called a call stack (often termed just the "stack"). A stack is a group of memory locations that keeps track of information about subroutines of an executing program. The stack may or may not be contiguous. Adding an item to the stack is referred to as a push. Removing the most recent item added to the stack and placing it into a register is referred to as a pop.

Registers within the processor may be dedicated to setting up and maintaining a stack by storing addresses (called "pointers") of one or more memory locations corresponding to the stack. When a pointer is changed to a different address it may be said the pointer position was moved. A pointer called a stack pointer points to the address of the last item to be placed on the stack. Some compilers may also use a pointer called the stack frame pointer that points to the address that the stack pointer was before the most recent function call. A pointer called the instruction pointer points to the address of the next instruction to be executed. A pointer called the return instruction pointer is the memory location of the instruction the processor needs to return to (often termed the "return address") at the end of the current function—which is usually the address immediately following that of the call instruction that directed the control flow to the current function. When a subroutine is called, the return address is pushed onto the stack. The called subroutine, when finished, pops the return address from the stack and returns control to that address.

Malicious code execution is a concern in modern software as it allows malicious code (such as viruses, worms, Trojan horses, or other undesirable applications) to be executed without the computer user's knowledge or consent. Malicious code may be executed by nefarious individuals by abusing software vulnerabilities to overwrite control flow elements. Control flow elements include pointers to functions, return addresses saved on the stack, and others. Overwriting even a single control flow element may allow the malicious code to control what code is executed once the overwritten control flow element is used. The malicious code may use the overwritten control element to re-use code currently existing in executable memory in an order unintended by the software program, but advantageous to the attacker. Alternatively, the malicious code may insert itself into executable memory and direct the instruction pointer to the address of the malicious code causing the system to execute the malicious code. Several prevention mechanisms exist to protect against exploitation of this kind, but they suffer from exploitable vulnerabilities or unacceptable performance impacts. Some of these protection mechanisms include: canary protection, non-executable memory, and address space layout randomization (ASLR).

Canary protection adds values before protected elements, such as control flow elements. If these added values are overwritten operation will cease. To incorporate canary protection compiler heuristics need to modify code and define protected elements. Once these elements have been defined, bypassing possibilities are enabled. Pointers may be used to point directly to the protected element bypassing the canary values and not overwriting them. Control flow elements are indirectly protected and that indirect protection may be bypassed.

Non-executable memory flagging is a method for protecting against buffer overflow attacks. These attacks force the program to store malicious code in an area of memory not intended for code. Buffer overflow attacks often cause programs to write code to the stack, in the process overwriting the return address. When the current function gets to the return operation the overwritten return address will direct the processor to the malicious code written onto the stack. To fight against this, operating systems often flag one or more areas of memory as non-executable. An attempt to execute code in the areas designated as non-executable will throw an exception and terminate the software program.

Often the stack will be designated as non-executable. Thus if the processor is directed to execute malicious code stored on the stack an exception will be thrown and the software program will terminate. Non-executable memory may be bypassed with return-oriented programming (ROP) techniques. Instead of having the return address point back to malicious code on the stack, the return address may be directed to instructions already contained in the program. Most software programs contain common code or libraries that are well known and easier to exploit. ROP techniques also fill the stack with desired return addresses rather than executable code. This way every time a section of code completes in a return instruction, the next address that is popped off of the stack directs the processor to the next set of code the attacker wants used. In this manner the malicious code may jump around, using parts of code already placed in memory, but in the order the attacker desires, not in the order intended by the program. By doing this the malicious code avoids areas in memory that are flagged non-executable. Only memory areas that already have executable code in them are used and the non-executable memory is bypassed.

ASLR works by randomly assigning key software program data areas in memory. This makes it more challenging for an attacker to ascertain the location of code in memory to overwrite or return to. Although ASLR makes it more difficult for an attacker, an attacker still has methods of overcoming the protection. ASLR may be circumvented by forcing a memory leak, which allows the attacker to discover the addresses of exploitable code and use it to launch an attack using ROP techniques. One example involves format string functions that may be exploited and used to pop elements off the stack until both the return address and stack frame pointer are extracted. The return address will give the address of executable code, likely somewhere in a programming library, and the frame pointer will give the location of the stack in memory. Once these addresses are determined ROP techniques may be used by the attacker.

Disclosed in some examples are methods, systems, and machine readable mediums for encrypting return addresses with a cryptographic key. The call and return operations may be changed to incorporate an XOR operation on the return address with the cryptographic key. Upon calling a function, the return address may be XORed with the key which encrypts the return address. The encrypted return address may then be placed upon the stack in the usual place. Upon returning from the function, the return address may be retrieved from the stack and XORed with the cryptographic key which then decrypts the return address. The processor may then return control to the address indicated by the unencrypted return address. This method makes modifications of the return address useless as an attack vector because the result of modifying the return address will be unpredictable to the attacker as a result of the XOR operation done on the return address. The XOR operation on the return operation will change the address the attacker injected, causing control flow to pass to a portion of memory that was not intended by the attacker and does not contain the attacker's code. Because the XOR operation is relatively fast, this method provides increased security with little impact to the software program runtime.

Some examples may be used protect Operating System (OS) privileged code, code run in System Management Mode, and software programs. Because the protection may be built into the call and return operations, the protection may be applied to any code or program that utilizes these operations. The OS may determine the use of a stack as well as call and return operations. In some examples this may allow every program to be protected using return address encryption. In other examples only some programs may be protected using return address encryption.

In some examples, the cryptographic key is a key generated according to the principles of One Time Pad (OTP) cryptography. That is, a key that is a randomly generated cryptographic key. In some examples, the length of the key is the same as the length of the return address (e.g., 32 or 64 bits). If the key is only used once, is truly random, and only the sender and receiver know the key, OTP is a method of encryption that is theoretically unbreakable. In some examples the random numbers may be generated using a random number generator (RNG) or a pseudorandom number generator (PRNG). For example, the RDRAND instruction available on some modern processors may be utilized. In other examples, different cryptographic keys may be utilized (e.g., symmetrical keys). For example, various types of symmetric and public-key (asymmetric) cryptography may be utilized. For example, Rivest, Shamir, Adleman (RSA) keys which rely upon large prime numbers. In these examples a first key of a symmetric key pair may encrypt the return address and a second key of the symmetric key pair may decrypt the return address.

In some examples, a same cryptographic key may be utilized for a predetermined number of call/return pairs. Once the key has been utilized the predetermined number of call/return pairs, the key may be replaced by a new key. In some examples, the predetermined number may be 1 such that the key is only used for one call/return pair. In other examples, the predetermined number may be more than 1, for example, 2. While use of a key for more than one call/return pair is less secure, it is also faster and an attacker is not likely to be able to break the encryption in the time it takes to re-use the key if the predetermined number of reuses is small enough. In fact, the predetermined number of reuses may be optimized such that an acceptable balance may be found between a probability that the key may be solved for and the performance penalty of regenerating a key. In some examples, upon initialization of a process, the system may generate a plurality of a keys to use and place them in a protected memory location. This concentrates the performance hit in generating keys in the initialization stage of a process. The number of keys to pre-generate may be predetermined or may be configurable (e.g., from the O/S).

In some examples there may be three separate impacts to software program runtime. The first impact to software program runtime may be when the plurality of keys are initialized, adding a processing time to software program initialization. This time may be minimized by taking advantage of hardware mechanisms to generate random numbers. The second impact to software program runtime may be the single bitwise operation XOR operation that is added to both the call and return operations. An XOR operation is one of the fastest operations executing in a single cycle. The third, and potentially most significant impact to runtime may be the generation of a replacement key for a used key during the return operation. Again, if the key generation utilizes a fast random number generator (e.g., a hardware random number generator, available, for example through a RDRAND instruction), this penalty may be minimized.

In a modern computing system, many programs feature procedure calls that are several layers deep. Thus, there may be many encrypted addresses stored on the stack. A dedicated area of memory may track the keys for each encrypted address. In some examples, a dedicated register called the Key Stack Pointer (KSP) may be assigned to track a current position in the memory area. By manipulating the KSP, the call and return functions may determine the correct key to use for both encrypting and decrypting the return address. In some examples, the KSP register and the memory area where keys are stored may only be accessible by the call/return operations, thus protecting the key memory from an attacker. In some examples one or more of the boundaries of the key memory may be kept in a register to verify that the KSP does not point beyond to an illegal value. In some examples, a plurality of keys may be pre-generated at application initialization and stored in this location in memory.

Turning now to FIG. 1, a flowchart of a method 1000 for a call operation utilizing encrypting on the return address is shown according to some examples of the present disclosure. Method 1000 may be performed on any machine where a function call results in storing a return address (e.g., machine 6000 of FIG. 6). At operation 1010 the processor receives a call instruction. At operation 1020 the current instruction pointer may be read as a return address. At operation 1025, a key may be determined. For example, the key may be read from a location in memory (e.g., protected memory) using a pointer, such as a KSP pointer. At operation 1030 an XOR operation may be carried out by the processor 3010 on the return address and the key to produce a return address. At operation 1040 the encrypted return address may be stored on the stack so that it may be retrieved at the return operation of the current function. At operation 1050 the stack pointer may be moved to the next position in memory due to the addition of the return address to the stack. At operation 1060, in some examples, the KSP may be moved to the next position in memory so as not to reuse the same key if another function is called before the current function ends and executes a return operation.

Prior to moving the KSP pointer, a check may be performed to ensure the KSP pointer does not move past the end of the memory allocated for key storage. If moving the KSP pointer would cause it to point past the end of the memory allocated for keys, the system may take a number of actions. One possibility is that the KSP pointer remains at its current position, and all subsequent calls utilize the same key. Another possibility is an error or exception. Yet another possibility is that the processor may set a flag and discontinue return address encryption until the KSP pointer moves away from the end of the memory allocated for keys. At operation 1070 the processor may proceed to the next instruction, or operation needed to complete the call operation.

Figure 2:
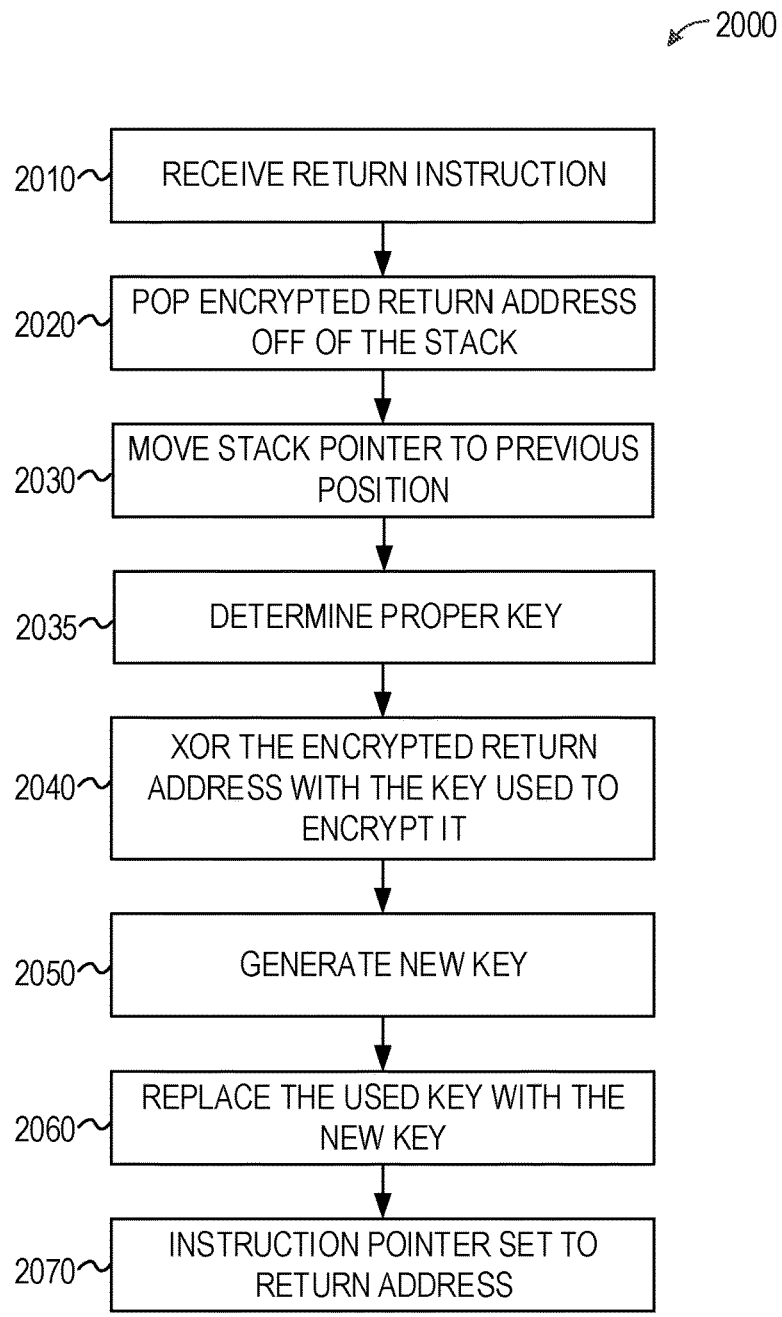
FIG. 2 shows a flow chart of a method for a return function utilizing OTP encryption on the return address according to some examples of the present disclosure.

Turning now to FIG. 2, a flowchart of a method 2000 for a return operation utilizing encryption on the return address is shown according to some examples of the present disclosure. Method 2000 may be performed in any computing device where an encrypted return address has been stored prior to exiting the current function with a return operation. At operation 2010 the control unit may receive a return instruction that directs the processor to execute the operations that comprise a return operation. At operation 2020 the encrypted return address may be popped from the stack. At operation 2030 the stack pointer may be moved back to its previous position in memory, effectively deleting the return address from the stack. At operation 2035, the proper key may be determined. For example, the KSP may be decremented and the key at that address may be read from memory. In another example the key may be read from the previous KSP position without moving the KSP. At operation 2040 the encrypted return address may be XORed with the key used to encrypt it. This unencrypts the encrypted return address, resulting in the original return address. At operation 2050, in some examples, a new key may be generated. In some examples this may be done with a random number generator. At operation 2060, in some examples, the used key may be replaced in memory with the newly generated key, thus avoiding key reuse. In other examples, the key is reused (as noted before) for one or more additional call/return pairs. At operation 2070 the instruction pointer may be set to the return address, thereby continuing the software program after the function call.

While the above figures described a situation in which the KSP is advanced after the call function, and subsequently the KSP must be decremented prior to decrypting on a return function, one of ordinary skill in the art with the benefit of the present disclosure will appreciate that other methods of tracking the appropriate key may be utilized. For example, other data structures such as tables, or multiple pointers may be utilized to track the correct key for a correct return address. In other examples, rather than advance the KSP after the call function encrypts the return address, the KSP may be advanced before the call function encrypts the return address. In this case, on a return function, the decryption uses the value pointed at by the KSP to decrypt the return address and then the KSP is decremented. For example, the following table compares the two approaches for a series of call and return functions.

| advance KSP after encryption, decrement before decryption | advance KSP before encryption, decrement after decryption |
| --- | --- |
| Call Function 1 encrypt return address (RADDR) 1 with key 1 in memory position 1 advance KSP to point to key 2 in memory position 2 | Call Function 1 advance KSP to memory position 2 to point at key 2 encrypt RADDR 1 with key 2 |
| Call Function 2 encrypt RADDR2 with key 2 in memory position 2 advance KSP to key 3 in memory position 3 | Call Function 2 advance KSP to memory position 3 to point at key 3 encrypt RADDR2 with key 3 |
| Return from Function 2 move KSP from memory position 3 to memory position 2 decrypt RADDR 2 using key 2 in memory position 2 replace key 2 in memory position 2 with key 4 in memory position 2 | Return from Function 2 decrypt RADDR2 with key 3 replace key 3 in memory position 3 with key 4 move KSP to memory position 2 to point at key 2 |
| Call Function 3 encrypt RADDR3 with key 4 in memory position 2 advance KSP to key 3 in memory position 3 | Call Function 3 advance KSP to memory position 3 to point at key 4 encrypt RADDR3 with key 4 in memory position 3 |
| Return from Function 3 move KSP from memory position 3 to memory position 2 decrypt RADDR3 using key 4 in memory position 2 replace key 4 with key 5 in memory position 2 | Return from Function 3 decrypt RADDR3 with key 4 in memory position 3 replace key 4 in memory position 3 with key 5 Move KSP to memory position 2 to point at key 2 |
| Return from Function 1 move KSP from memory position 2 to memory position 1 decrypt RADDR1 using key 1 in memory position 1 replace key 1 with key 6 in memory position 1 | Return from Function 1 decrypt RADDR1 with key 2 at memory position 2 replace key 2 with key 6 in memory position 2 move KSP from memory position 2 to memory position 1 |

Figure 3:
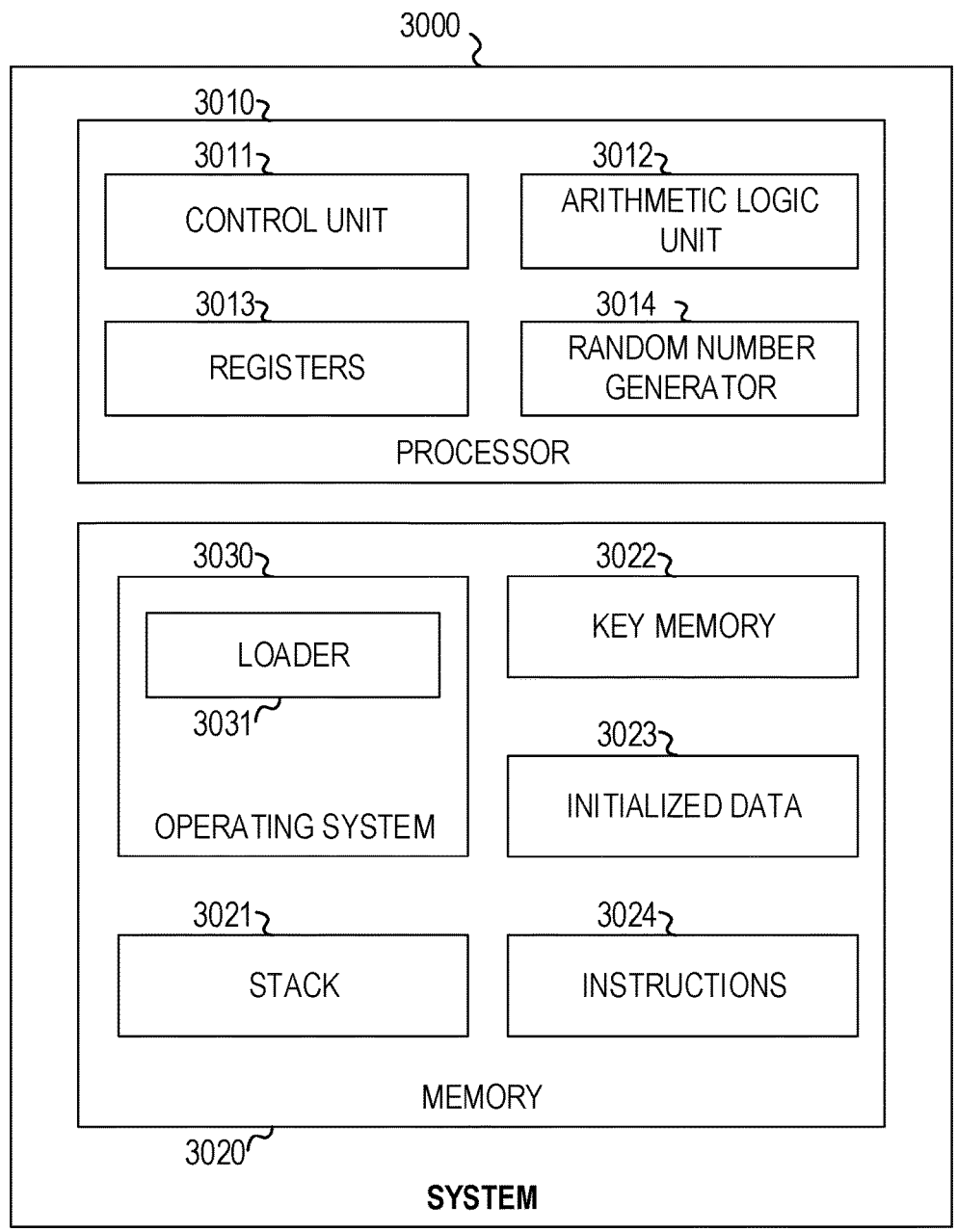
FIG. 3 shows a block diagram of a system for using OTP encryption on a return address according to some examples in the present disclosure.

Turning now to FIG. 3, a block diagram of a system 3000 for using encryption on a return address is shown according to some examples in the present disclosure. The system may comprise a processor 3010 and a memory 3020. The processor 3010 may be comprised of at least a control unit 3011, an arithmetic logic unit (ALU) 3012, a set of registers 3013, and a Random Number Generator (RNG) 3014. In some examples, the RNG 3014 may be a Digital RNG that is hardware based. The ALU 3012 may receive data and an instruction code to designate what operation to execute on the data received. The ALU 3012 operations may include but may not be limited to bitwise operations such as NOT, AND, OR, and XOR or arithmetic operation such as addition, subtraction, division, and multiplication. The ALU 3012 may carry out the XOR operation used to encrypt the return address as described in operations 1030 and 2040 of FIGS. 1 and 2. Registers 3013 may store data the processor needs access to. The registers 3013 may store things including, but may not be limited to, the stack pointer, the instruction pointer, the KSP, a random number retrieved from the RNG 3014, and other data relevant to recently executed instructions or current instructions. In some examples, the registers 3013 may store operands for the ALU 3012. The control unit 3011 may control the flow of instructions to and from the processor 3010 and memory 3020.

The memory 3020 may be comprised of segments including at least a stack 3021, a key memory (which may take the form of a stack) 3022, initialized data 3023, instructions 3024 and an operating system 3030. The stack 3021 may be used to store return addresses, function parameters, and other data. In some examples the return addresses stored on the stack 3021 have been encrypted with a key as described in operation 1030. The key memory 3022 may store the keys (e.g., OTP keys). The initialized data 3023 may store global variables, static local variables, and other data the software program needs access to regularly. The instructions 3024 may include the instructions needed to execute one or more software programs.

The operating system 3030 may be loaded into memory 3020 at startup and may be comprised of at least a loader 3031. The operating system 3030 is responsible for preparing software programs to run on the system 3000. This may include using the loader 3031 to issue instructions to the processor 3010 to segment the memory 3020 and initialize the segments (e.g., stack 3021 and key stack 3022). The loader 3031 may issue instructions to the processor 3010 to load and initialize the stack 3021 into a segment of memory 3020. The loader 3031 may issue instructions to the processor 3010 to segment and initialize the key memory 3022 in memory 3020 at the start of the software program. Initializing the key memory 3022 may include issuing instructions that may invoke the RNG 3014 to generate keys. The loader 3031 may issue instructions to the processor 3010 to load software program data into the initialized data 3023 segment of memory 3020. The loader 3031 may issue instructions to the processor 3010 to load software program instructions into the instruction 3024 segment of memory 3020. The operating system 3030 may also indicate to the processor whether encryption is to be used on a given software program.

Return address encryption may be enabled on a per-core basis such that one processor core may run with return address encryption and one core may run without return address encryption. Thus allowing for separate handing of separate instruction threads as necessary. In some examples, return address encryption may be enabled on a per-application basis. For example, some applications, such as the operating system itself or its components, anti-virus or anti-malware applications and other sensitive applications may be protected, whereas other applications that may be more performance sensitive may not.

The control unit 3011 may interpret instruction codes given to the processor 3010 and direct information to the appropriate components and modules. For example, the control unit may receive a call instruction. In response, the control unit 3011 may read the current instruction pointer in registers 3013 to determine a return address and the control unit 3011 may also consult the KSP in registers 3013 to determine the location in key memory 3022 where the key is stored. The key may be determined by reading the key in the memory location indicated by the KSP. Once the key is determined, the control unit 3011 may then instruct the ALU 3012 to perform an XOR operation on the return address and the key to encrypt the return address. Once the return address is encrypted, it may be placed upon the stack 3021.

The control unit 3011 may receive a return instruction. In response, the control unit 3011 may read the encrypted return address from the stack 3021 in memory 3020. The control unit 3011 may change the stack pointer in registers 3013 so that the stack pointer is in the proper position for the calling function (e.g., the function that the processor is returning control to). The control unit 3011 may determine the appropriate encryption key from the key memory 3022. For example, the control unit 3011 may use a memory location derived from the KSP to determine the location in the key memory 3022 where the key that encrypted the return address is stored. Once the key is determined, the control unit 3011 instructs the ALU 3012 to XOR the key with the return address to produce an unencrypted return address. The control unit 3011 may then pass execution control to the instruction stored in the return address. As part of the above process, the control unit 3011 may update and control the KSP. For example, and as explained above, the control unit 3011 may increment or decrement the KSP as necessary to ensure that the KSP properly points to the proper memory address.

Figure 4:
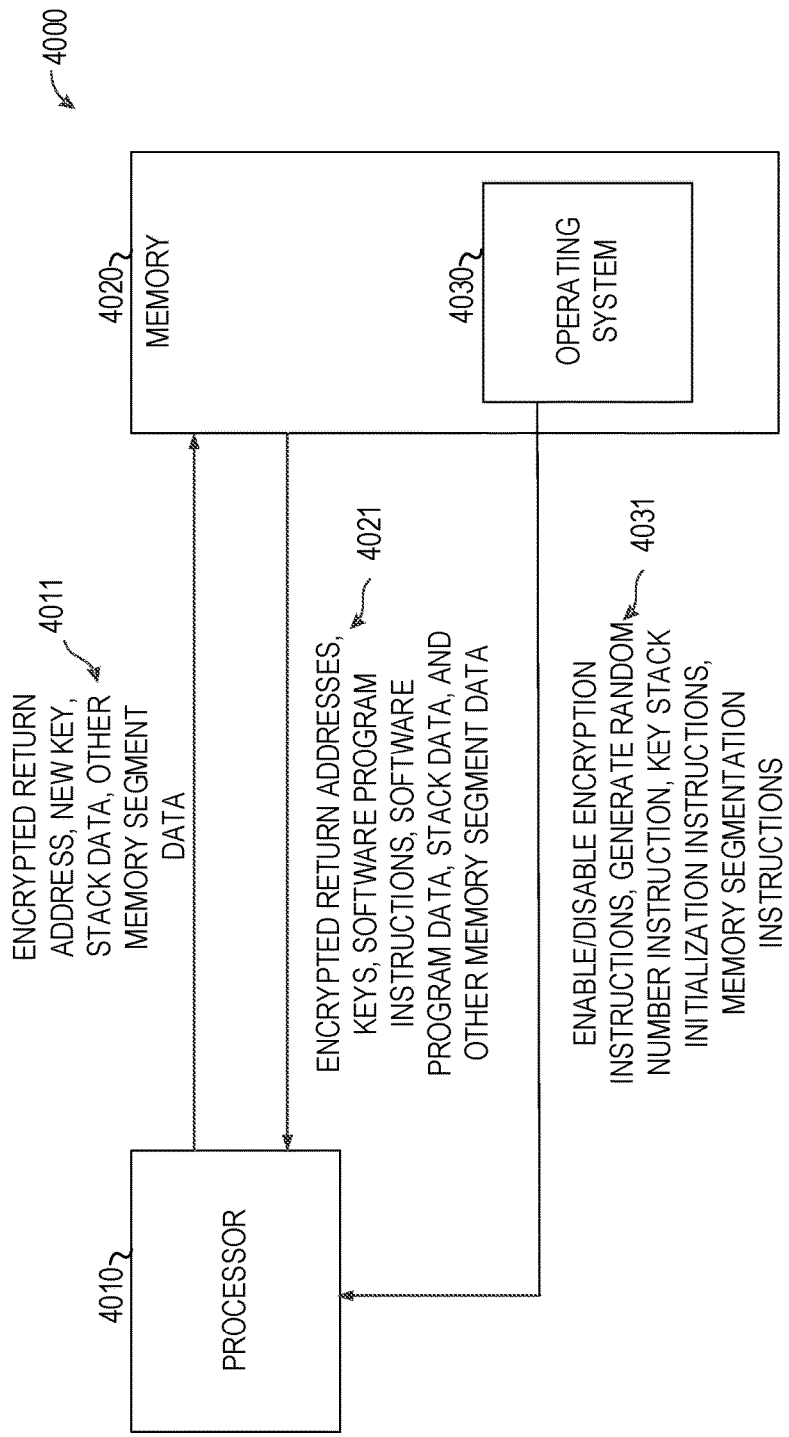
FIG. 4 shows an information flow diagram of a system for using OTP encryption on a return address according to some examples in the present disclosure.

Turning now to FIG. 4, an information flow diagram of a system 4000 for using encryption on a return address is shown according to some examples in the present disclosure. The system 4000 may be comprised of at least a processor 4010 and a memory 4020. In some embodiments the processor 4010 may be one example of the processor 3010 from FIG. 3. In some embodiments the memory 4020 may be one example of the memory 3020 from FIG. 3. An operating system 4030 may be loaded into the memory at startup. In some embodiments the operating system 4030 may be an example of the operating system 3030 of FIG. 3. Information flow 4011 may comprise data sent from the processor 4010 to the memory 4020 and may include, but may not be limited to the encrypted return addresses, new keys, and other memory segment data. Information flow 4021 may comprise data retrieved from the memory 4020 by the processor 4010 which may include, but may not be limited to, the encrypted return addresses, keys, operating system instructions and other memory segment data. Information flow 4031 may comprise data retrieved from the operating system 4030 which may include, but may not be limited to, enable/disable return address encryption instructions, generate random number instructions, stack initialization instructions, and memory segmentation instructions.

In some examples the processor 4010 may receive via information flow 4011 a call instruction from the software program instructions in memory 4020. As part of the call operation the processor 4010 may retrieve, via information flow 4021, a key from memory 4020 in order to encrypt the return address. The return operation may further include the processor 4010 storing an encrypted return address in memory 4020 via information flow 4011. The processor 4010 may receive via information flow 4012 a return instruction from the software program instructions in memory 4020. As part of the return operation the processor 4010 may retrieve, via information flow 4021, the key from memory 4020 that was used to encrypt the return address in order to unencrypt the return address.

In some examples at the beginning of a software program the processor 4010 may receive instructions from the operating system 4030 via information flow 4031. These instructions may include instructions to enable/disable return address encryption on a per-core, or per-process basis, instructions to generate a set of random numbers for key memory initialization, and other instructions associated with memory segmentation relative to the software program being prepared.

Figure 5:
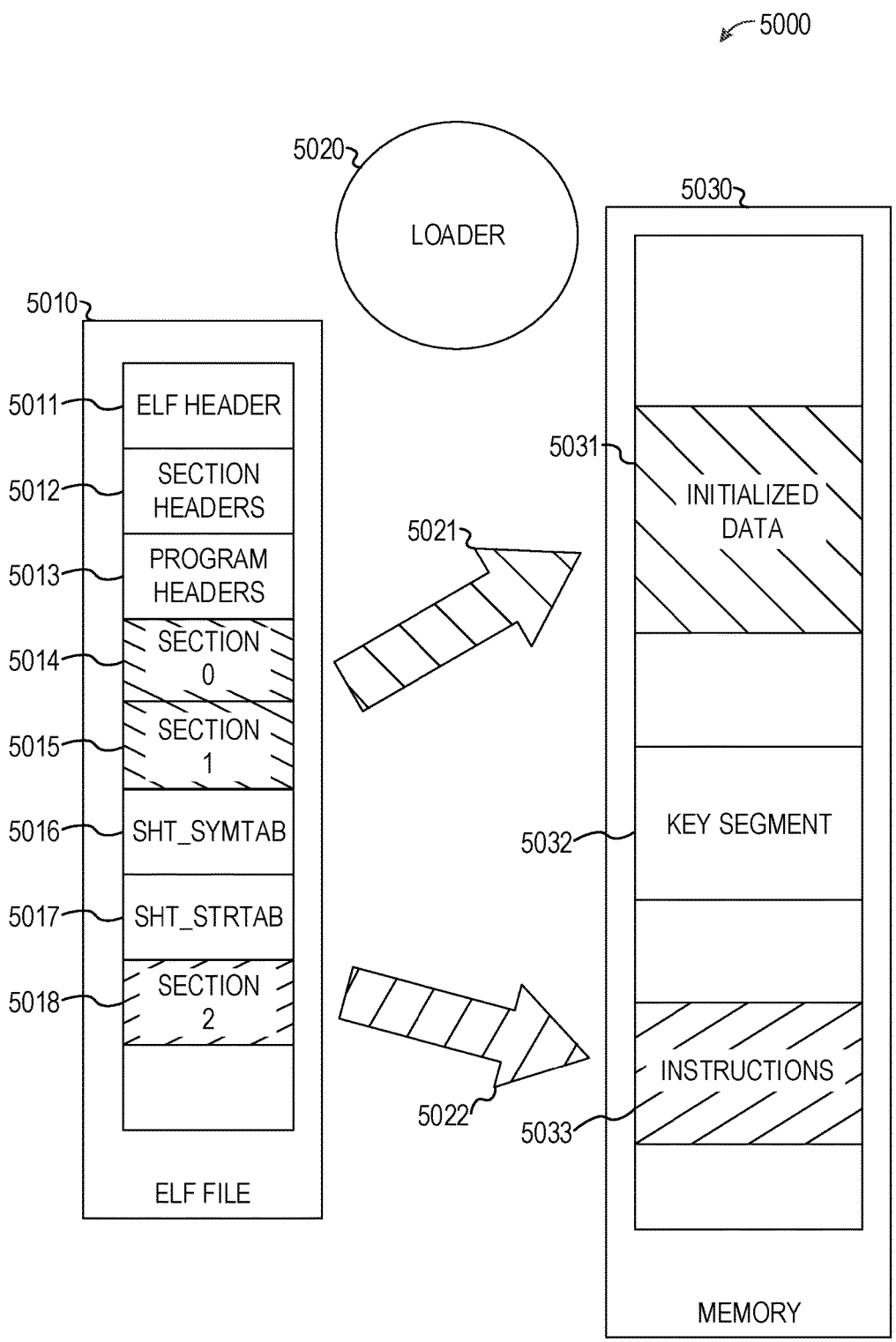
FIG. 5 is a block diagram illustrating the operating system loader allocating segments of memory including the OTP stack according to some examples of the present disclosure.

Turning now to FIG. 5, a block diagram 5000 illustrating the operating system loader 5020 allocation of multiple segments of memory including a key memory stack according to some examples of the present disclosure. The loader 5020 is used to load the software program at its start and prepare it to be run by the machine. The block diagram 5000 shows that operating system allocation of segments of memory may include an Executable and Linkable Format (ELF) file 5010, a loader 5020, and a memory 5030. While the example uses an ELF file 5010, one skilled in the art will appreciate that the ELF file 5010 could be a portable executable (PE) file, or any other executable file type.

In some embodiments the ELF file 5010 may provide the operating system the information needed to give the appropriate instruction to initialize a software program and segment requirements for the memory 5030. The ELF file 5010 may include an ELF header 5011, section headers 5012, program headers 5013, "section 0" 5014, "section 1" 5015, sht_symtab 5016, sht_strtab 5017, and "section 2" 5018. The ELF header 5011 may define the number of bits to be used in addresses. The section headers 5012 may describe the sections contained within the ELF file 5010. The program headers 5013 may describe the segments within the ELF file 5010, for example, the number and size of the segments. "Section 0" 5014 and "section 1" 5015 may contain data to be initialized in memory 5030 as a segment. The sht_symtab 5016 and sht_strtab 5017 sections may contain other relevant information for the operating system such as a symbol table and a string table. "Section 2" 5018 may contain software program instructions.

In some embodiments the loader 5020 may give the processor instructions to take the appropriate sections from the ELF file 5010, segment the memory 5030, and load the appropriate sections into memory 5030. Arrow 5021 illustrates the loader 5020 providing instructions that take "section 0" 5014 and "section 1" 5015 and load the data contained therein into the initialized data segment 5031. Arrow 5022 illustrates the loader 5020 providing instructions that take "section 2" 5018 and load the data contained therein into the instructions segment 5033 of the memory 5030.

In some embodiments the loader 5020 may give instructions to the processor to properly segment the memory 5030. The segments may include at least an initialized data segment 5031, a key memory segment 5032, and an instructions segment 5033. The initialized data segment 5031 and the instructions segment 5033 may be retrieved from an executable file such as an ELF file 5010. The memory key segment 5032 may be loaded and allocated according to instructions given by the loader 5020. In some examples the memory key segment 5032 may be an example of the key stack 3022 of FIG. 3. The instructions given by the loader 5020 may include instructions to generate new cryptographic keys from a random number generator and load the keys into the key memory segment 5032 thus preparing keys for the software program's call and return instructions.

Figure 6:
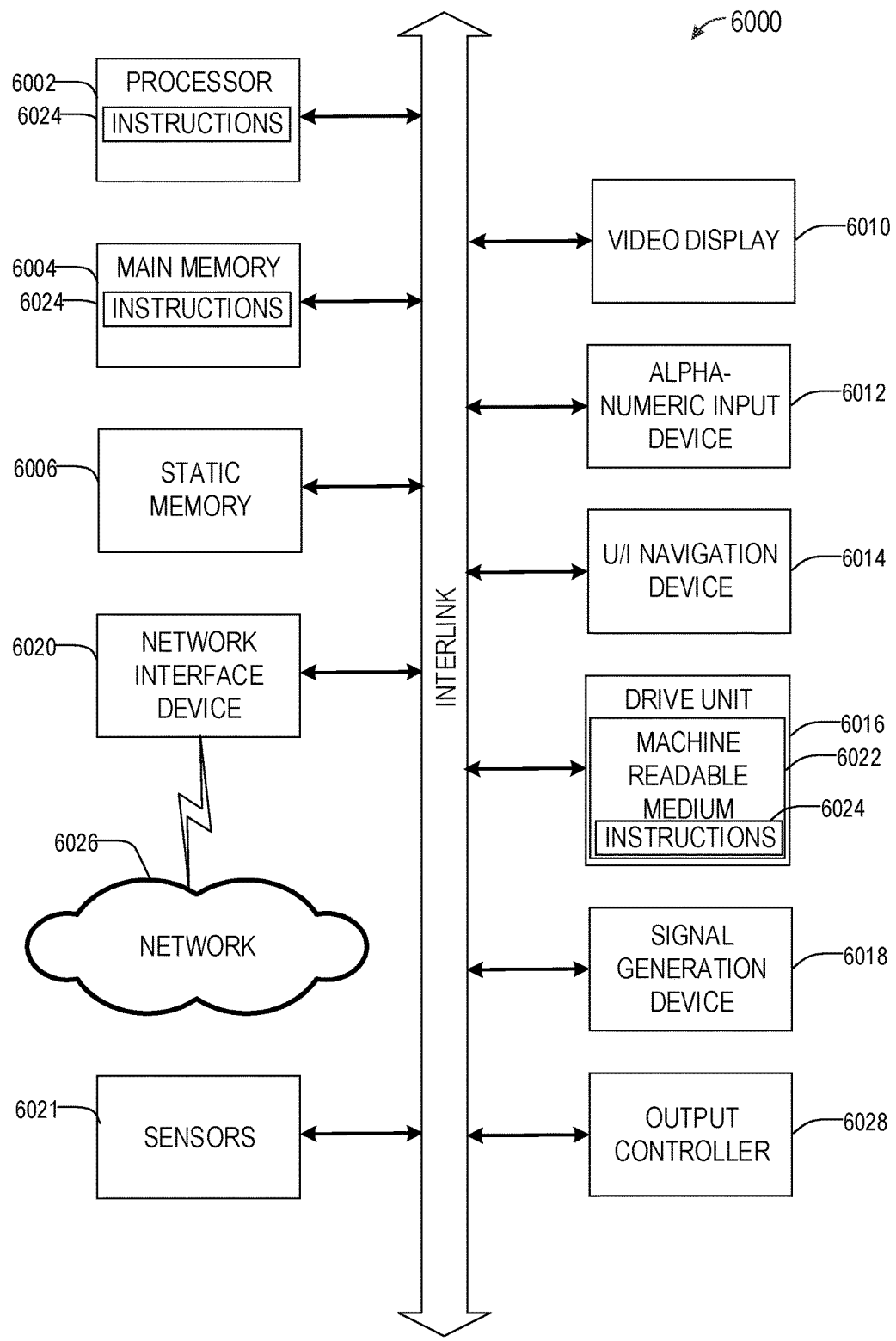
FIG. 6 is a block diagram illustrating an example of a machine upon which one or more embodiments may be implemented.

FIG. 6 illustrates a block diagram of an example machine 6000 upon which any one or more of the techniques (e.g., methodologies) discussed herein may be performed. For example, the processor 6002 of machine 6000 may be processor 4010 or 3010, and may execute instructions to perform the methods of FIGS. 1 and 2. Furthermore, memory 6004 may be memory 5030, 4020, 3020, and may store and retrieve values to assist the processor in performing the methods of FIGS. 1 and 2. In alternative embodiments, the machine 6000 may operate as a standalone device or may be connected (e.g., networked) to other machines. In a networked deployment, the machine 6000 may operate in the capacity of a server machine, a client machine, or both in server-client network environments. In an example, the machine 6000 may act as a peer machine in peer-to-peer (P2P) (or other distributed) network environment. The machine 6000 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 6000 may include a hardware processor 6002 (e.g., a central processing unit (CPU), a graphics processing unit (GPU), a hardware processor core, or any combination thereof), a main memory 6004 and a static memory 6006, some or all of which may communicate with each other via an interlink (e.g., bus) 6008. The machine 6000 may further include a display unit 6010, an alphanumeric input device 6012 (e.g., a keyboard), and a user interface (UI) navigation device 6014 (e.g., a mouse). In an example, the display unit 6010, input device 6012 and UI navigation device 6014 may be a touch screen display. The machine 6000 may additionally include a storage device (e.g., drive unit) 6016, a signal generation device 6018 (e.g., a speaker), a network interface device 6020, and one or more sensors 6021, such as a global positioning system (GPS) sensor, compass, accelerometer, or other sensor. The machine 6000 may include an output controller 6028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 6016 may include a machine readable medium 6022 on which is stored one or more sets of data structures or instructions 6024 (e.g., software) embodying or utilized by any one or more of the techniques or functions described herein. The instructions 6024 may also reside, completely or at least partially, within the main memory 6004, within static memory 6006, or within the hardware processor 6002 during execution thereof by the machine 6000. In an example, one or any combination of the hardware processor 6002, the main memory 6004, the static memory 6006, or the storage device 6016 may constitute machine readable media.

While the machine readable medium 6022 is illustrated as a single medium, the term "machine readable medium" may include a single medium or multiple media (e.g., a centralized or distributed database, and/or associated caches and servers) configured to store the one or more instructions 6024.

The term "machine readable medium" may include any medium that is capable of storing, encoding, or carrying instructions for execution by the machine 6000 and that cause the machine 6000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal. In some examples the machine readable medium may include instructions in the form of configured logic gates, configured transistor gates, microcode, and/or firmware.

The instructions 6024 may further be transmitted or received over a communications network 6026 using a transmission medium via the network interface device 6020. The Machine 6000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 6020 may include one or more physical jacks (e.g., Ethernet, coaxial, or phone jacks) or one or more antennas to connect to the communications network 6026. In an example, the network interface device 6020 may include a plurality of antennas to wirelessly communicate using at least one of single-input multiple-output (SIMO), multiple-input multiple-output (MIMO), or multiple-input single-output (MISO) techniques. In some examples, the network interface device 6020 may wirelessly communicate using Multiple User MIMO techniques.

OTHER NOTES AND EXAMPLES

Example 1 is a system for preventing malicious code execution in a processor, the system comprising: a processor; a memory, the memory communicatively coupled to the processor and comprising instructions, which when performed by the processor, causing the processor to perform operations comprising: receiving a call instruction; responsive to receiving the call instruction: determining a return address based upon a current instruction pointer; performing an XOR operation on the return address using a cryptographic key to create an encrypted return address; and pushing the encrypted return address onto a stack.

In Example 2, the subject matter of Example 1 optionally includes the operations further comprising: generating a plurality of cryptographic keys using a random number generator; storing the plurality of cryptographic keys in a segment of memory; and wherein the cryptographic key is one of the plurality of cryptographic keys.

In Example 3, the subject matter of Example 2 optionally includes wherein the random number generator is a hardware random number generator; and wherein a size of each of the plurality of cryptographic keys is the same as an address size utilized by the processor.

In Example 4, the subject matter of any one or more of Examples 1-3 optionally include the operations further comprising: storing the address of the cryptographic key in a dedicated register as a key address pointer.

In Example 5, the subject matter of Example 4 optionally includes wherein the dedicated register, after being initialized, is only accessible by call operations and return operations.

In Example 6, the subject matter of any one or more of Examples 4-5 optionally include the operations further comprising: receiving a return instruction; responsive to receiving the return instruction: popping the encrypted return address off of the stack; and performing an XOR operation on the encrypted return address using the cryptographic key to obtain the return address.

In Example 7, the subject matter of Example 6 optionally includes the operations further comprising: moving the key address pointer to a next key in the plurality of keys prior to encrypting the return address; and moving the key address pointer to a previous key in the plurality of keys subsequent to performing an XOR operation on the encrypted return address.

In Example 8, the subject matter of any one or more of Examples 6-7 optionally include the operations further comprising: moving the key address pointer to a next key in the plurality of keys subsequent to encrypting the return address; and moving the key address pointer to a previous key in the plurality of keys prior to performing an XOR operation on the encrypted return address.

In Example 9, the subject matter of any one or more of Examples 6-8 optionally include the operations further comprising: responsive to performing the XOR operation on the encrypted return address using the cryptographic key to obtain the return address: generating a new cryptographic key using a random number generator; and replacing the cryptographic key with the new cryptographic key.

Example 10 is a method for preventing malicious code execution in a processor, the method comprising: receiving a call instruction; responsive to receiving the call instruction: determining a return address based upon a current instruction pointer; performing an XOR operation on the return address using a cryptographic key to create an encrypted return address; and pushing the encrypted return address onto a stack.

In Example 11, the subject matter of Example 10 optionally includes the method further comprising: generating a plurality of cryptographic keys using a random number generator; storing the plurality of cryptographic keys in a segment of memory; and wherein the cryptographic key is one of the plurality of cryptographic keys.

In Example 12, the subject matter of Example 11 optionally includes wherein the random number generator is a hardware random number generator; and wherein a size of each of the plurality of cryptographic keys is the same as an address size utilized by the processor.

In Example 13, the subject matter of any one or more of Examples 10-12 optionally include the method further comprising: storing the address of the cryptographic key in a dedicated register as a key address pointer.

In Example 14, the subject matter of Example 13 optionally includes wherein the dedicated register, after being initialized, is only accessible by call operations and return operations.

In Example 15, the subject matter of any one or more of Examples 13-14 optionally include the method further comprising: receiving a return instruction; responsive to receiving the return instruction: popping the encrypted return address off of the stack; and performing an XOR operation on the encrypted return address using the cryptographic key to obtain the return address.

In Example 16, the subject matter of Example 15 optionally includes the method further comprising: moving the key address pointer to a next key in the plurality of keys prior to encrypting the return address; and moving the key address pointer to a previous key in the plurality of keys subsequent to performing an XOR operation on the encrypted return address.

In Example 17, the subject matter of any one or more of Examples 15-16 optionally include the method further comprising: moving the key address pointer to a next key in the plurality of keys subsequent to encrypting the return address; and moving the key address pointer to a previous key in the plurality of keys prior to performing an XOR operation on the encrypted return address.

In Example 18, the subject matter of any one or more of Examples 15-17 optionally include the method further comprising: responsive to performing the XOR operation on the encrypted return address using the cryptographic key to obtain the return address: generating a new cryptographic key using a random number generator; and replacing the cryptographic key with the new cryptographic key.

Example 19 is at least one machine-readable medium for preventing malicious code execution in a processor, the machine-readable medium including instructions, which when performed by a machine causes the machine to execute a malicious code execution prevention process that performs operations comprising: receiving a call instruction; responsive to receiving the call instruction: determining a return address based upon a current instruction pointer; performing an XOR operation on the return address using a cryptographic key to create an encrypted return address; and pushing the encrypted return address onto a stack.

In Example 20, the subject matter of Example 19 optionally includes the operations further comprising: generating a plurality of cryptographic keys using a random number generator; storing the plurality of cryptographic keys in a segment of memory; and wherein the cryptographic key is one of the plurality of cryptographic keys.

In Example 21, the subject matter of any one or more of Examples 19-20 optionally include the operations further comprising: storing the address of the cryptographic key in a dedicated register as a key address pointer.

In Example 22, the subject matter of Example 21 optionally includes wherein the dedicated register, after being initialized, is only accessible by call operations and return operations.

In Example 23, the subject matter of any one or more of Examples 21-22 optionally include the operations further comprising: receiving a return instruction; responsive to receiving the return instruction: popping the encrypted return address off of the stack; and performing an XOR operation on the encrypted return address using the cryptographic key to obtain the return address.

In Example 24, the subject matter of Example 23 optionally includes the operations further comprising: moving the key address pointer to a next key in the plurality of keys prior to encrypting the return address; and moving the key address pointer to a previous key in the plurality of keys subsequent to performing an XOR operation on the encrypted return address.

In Example 25, the subject matter of any one or more of Examples 23-24 optionally include the operations further comprising: moving the key address pointer to a next key in the plurality of keys subsequent to encrypting the return address; and moving the key address pointer to a previous key in the plurality of keys prior to performing an XOR operation on the encrypted return address.

Example 26 is a device for preventing malicious code execution in a processor, the device comprising: means for receiving a call instruction; responsive to receiving the call instruction: means for determining a return address based upon a current instruction pointer; means for performing an XOR operation on the return address using a cryptographic key to create an encrypted return address; and means for pushing the encrypted return address onto a stack.

In Example 27, the subject matter of Example 26 optionally includes the device further comprising: means for generating a plurality of cryptographic keys using a random number generator; means for storing the plurality of cryptographic keys in a segment of memory; and wherein the cryptographic key is one of the plurality of cryptographic keys.

In Example 28, the subject matter of Example 27 optionally includes wherein the random number generator is a hardware random number generator; and wherein a size of each of the plurality of cryptographic keys is the same as an address size utilized by the processor.

In Example 29, the subject matter of any one or more of Examples 26-28 optionally include the device further comprising: means for storing the address of the cryptographic key in a dedicated register as a key address pointer.

In Example 30, the subject matter of Example 29 optionally includes wherein the dedicated register, after being initialized, is only accessible by call operations and return operations.

In Example 31, the subject matter of any one or more of Examples 29-30 optionally include the device further comprising: means for receiving a return instruction; responsive to receiving the return instruction: means for popping the encrypted return address off of the stack; and means for performing an XOR operation on the encrypted return address using the cryptographic key to obtain the return address.

In Example 32, the subject matter of Example 31 optionally includes the device further comprising: means for moving the key address pointer to a next key in the plurality of keys prior to encrypting the return address; and means for moving the key address pointer to a previous key in the plurality of keys subsequent to performing an XOR operation on the encrypted return address.

In Example 33, the subject matter of any one or more of Examples 31-32 optionally include the device further comprising: means for moving the key address pointer to a next key in the plurality of keys subsequent to encrypting the return address; and means for moving the key address pointer to a previous key in the plurality of keys prior to performing an XOR operation on the encrypted return address.

In Example 34, the subject matter of any one or more of Examples 31-33 optionally include the device further comprising: responsive to performing the XOR operation on the encrypted return address using the cryptographic key to obtain the return address: means for generating a new cryptographic key using a random number generator; and means for replacing the cryptographic key with the new cryptographic key.

Example 35 is a device comprising means to perform a method as described in Examples 10-18.

Example 36 is at least one machine-readable medium including instructions, when executed, implement a method or realize a device as described in Examples 10-18.

What is claimed is:

1. A system for preventing malicious code execution in a processor, the system comprising:
   a processor; and
   a memory, the memory communicatively coupled to the processor and comprising instructions, which when performed by the processor, causing the processor to perform operations comprising:
   storing an address of a first cryptographic key of a plurality of cryptographic keys in a dedicated register as a key address pointer;
   receiving a call instruction;
   responsive to receiving the call instruction:
   determining a return address based upon a current instruction pointer;
   moving the key address pointer to point to a second cryptographic key, the second cryptographic key being a next key in the plurality of cryptographic keys;
   after moving the key address pointer, performing an XOR operation on the return address using the second cryptographic key to create an encrypted return address, the second cryptographic key being a single-use cryptographic key that is not used for encrypting subsequent return addresses; and
   pushing the encrypted return address onto a stack;
   receiving a return instruction; and
   responsive to receiving the return instruction:
   popping the encrypted return address off of the stack;
   performing an XOR operation on the encrypted return address using the second cryptographic key to obtain the return address;
   responsive to performing the XOR operation on the encrypted return address using the second cryptographic key to obtain the return address:
   generating a new cryptographic key using a random number generator; and
   replacing the second cryptographic key with the new cryptographic key;
   subsequent to performing the XOR operation on the encrypted return address, moving the key address pointer to point to the address of the first cryptographic key in the plurality of cryptographic keys.

2. The system of claim 1, the operations further comprising:
   generating the plurality of cryptographic keys using a random number generator;
   storing the plurality of cryptographic keys in a segment of memory; and
   wherein the cryptographic key is one of the plurality of cryptographic keys.

3. The system of claim 2, wherein the random number generator is a hardware random number generator; and
   wherein a size of each of the plurality of cryptographic keys is the same as an address size utilized by the processor.

4. The system of claim 1, wherein the dedicated register, after being initialized, is only accessible by call operations and return operations.

5. A method for preventing malicious code execution in a processor, the method comprising:
   storing an address of a first cryptographic key of a plurality of cryptographic keys in a dedicated register as a key address pointer;
   receiving a call instruction;
   responsive to receiving the call instruction:
   determining a return address based upon a current instruction pointer;
   moving the key address pointer to point to a second cryptographic key, the second cryptographic key being a next key in the plurality of cryptographic keys;
   after moving the key address pointer, performing an XOR operation on the return address using the second cryptographic key to create an encrypted return address, the second cryptographic key being a single-use cryptographic key that is not used for encrypting subsequent return addresses; and
   pushing the encrypted return address onto a stack;

receiving a return instruction; and
responsive to receiving the return instruction:
    popping the encrypted return address off of the stack;
    performing an XOR operation on the encrypted return address using the second cryptographic key to obtain the return address;
    responsive to performing the XOR operation on the encrypted return address using the second cryptographic key to obtain the return address:
        generating a new cryptographic key using a random number generator; and
        replacing the second cryptographic key with the new cryptographic key;
    subsequent to performing the XOR operation on the encrypted return address, moving the key address pointer to point to the address of the first cryptographic key in the plurality of cryptographic keys.

6. The method of claim 5, the method further comprising:
generating the plurality of cryptographic keys using a random number generator;
storing the plurality of cryptographic keys in a segment of memory; and
wherein the cryptographic key is one of the plurality of cryptographic keys.

7. The method of claim 6, wherein the random number generator is a hardware random number generator; and
    wherein a size of each of the plurality of cryptographic keys is the same as an address size utilized by the processor.

8. The method of claim 5, wherein the dedicated register, after being initialized, is only accessible by call operations and return operations.

9. At least one non-transitory machine-readable medium for preventing malicious code execution in a processor, the machine-readable medium including instructions, which when performed by a machine causes the machine to execute a malicious code execution prevention process that performs operations comprising:
    storing an address of a first cryptographic key of a plurality of cryptographic keys in a dedicated register as a key address pointer;
    receiving a call instruction;
    responsive to receiving the call instruction:
        determining a return address based upon a current instruction pointer;
        moving the key address pointer to point to a second cryptographic key, the second cryptographic key being a next key in the plurality of cryptographic keys;
        after moving the key address pointer, performing an XOR operation on the return address using the second cryptographic key to create an encrypted return address, the second cryptographic key being a single-use cryptographic key that is not used for encrypting subsequent return addresses; and
        pushing the encrypted return address onto a stack;
    receiving a return instruction; and
    responsive to receiving the return instruction:
        popping the encrypted return address off of the stack;
        performing an XOR operation on the encrypted return address using the second cryptographic key to obtain the return address;
        responsive to performing the XOR operation on the encrypted return address using the second cryptographic key to obtain the return address:
            generating a new cryptographic key using a random number generator; and
            replacing the second cryptographic key with the new cryptographic key;
        subsequent to performing the XOR operation on the encrypted return address, moving the key address pointer to point to the address of the first cryptographic key in the plurality of cryptographic keys.

10. The non-transitory machine-readable medium of claim 9, the operations further comprising:
generating the plurality of cryptographic keys using a random number generator;
storing the plurality of cryptographic keys in a segment of memory; and
wherein the cryptographic key is one of the plurality of cryptographic keys.

11. The non-transitory machine-readable medium of claim 9, wherein the dedicated register, after being initialized, is only accessible by call operations and return operations.

* * * * *